United States Patent
Raguram et al.

(10) Patent No.: US 7,433,964 B2
(45) Date of Patent: Oct. 7, 2008

(54) COHERENT PROVISIONING OF MULTIPLE TRAFFIC PATHS IN TRANSPORT NETWORKS

(75) Inventors: Sasisekharan Raguram, Hillsborough, NJ (US); Santhanam Srinivasan, Holmdel, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 609 days.

(21) Appl. No.: 10/053,781

(22) Filed: Jan. 20, 2002

(65) Prior Publication Data

US 2003/0140144 A1  Jul. 24, 2003

(51) Int. Cl.
G06F 15/16 (2006.01)
G06F 15/173 (2006.01)
H04L 12/28 (2006.01)

(52) U.S. Cl. .................. 709/238; 709/203; 370/351

(58) Field of Classification Search .......... 709/251, 709/222–230, 238–244, 202–204, 217–219, 709/236; 370/351, 230.1, 217–224, 235, 370/352

See application file for complete search history.

(56) References Cited

U.S. PATENT DOCUMENTS

| | | | | |
|---|---|---|---|---|
| 5,594,866 A * | 1/1997 | Nugent | ................ | 709/234 |
| 6,366,577 B1 * | 4/2002 | Donovan | ................ | 370/352 |
| 6,522,660 B1 * | 2/2003 | Mukaihara et al. | ......... | 370/443 |
| 6,594,268 B1 * | 7/2003 | Aukia et al. | ................ | 370/400 |
| 6,778,535 B1 * | 8/2004 | Ash et al. | ............ | 370/395.21 |
| 6,973,035 B2 * | 12/2005 | Seddigh et al. | ............ | 370/235 |
| 7,369,536 B2 * | 5/2008 | Donovan et al. | ............ | 370/352 |
| 2002/0041590 A1 * | 4/2002 | Donovan | ................ | 370/352 |
| 2002/0067693 A1 * | 6/2002 | Kodialam et al. | ......... | 370/216 |

* cited by examiner

Primary Examiner—Saleh Najjar
Assistant Examiner—Asad M Nawaz

(57) ABSTRACT

A method of coherently provisioning one or more paths through a transport network is disclosed. In other words, none of the traffic paths are provisioned unless all of the traffic paths can be provisioned. All of the nodes in one or more transport networks are listed that must be configured to provision all of the proposed traffic paths, and all of the nodes are checked, one after another, to ensure that each node can, in fact, provide all of the resources needed to establish all of the proposed traffic paths before any of the traffic paths are actually provisioned. As each node is visited, the set-up message directs each node to reserve, but not actually provision, the resources to be provided by that node for all of the proposed traffic paths. When all of the nodes have been visited, the set-up message re-visits each node and directs each node to actually provision the resources that had been previously reserved.

21 Claims, 7 Drawing Sheets

COHERENT PROVISIONING OF MULTIPLE TRAFFIC PATHS IN TRANSPORT NETWORKS

FIELD OF THE INVENTION

The present invention relates to telecommunications in general, and, more particularly, to techniques for provisioning traffic paths in transport networks.

BACKGROUND OF THE INVENTION

FIG. 1 depicts a schematic diagram of a transport network in the prior art in which two traffic paths—one SONET OC-48 working path and one SONET OC-48 protection path—are proposed to be provisioned.

FIG. 2 depicts a flowchart of the tasks associated with provisioning those traffic paths in the prior art. At task 201, the administrator of transport network 100 provisions the working path through transport network 100, in well-known fashion.

At task 202, the administrator of transport network 100 provisions the protection path through transport network 100, also in well-known fashion.

In some cases, the administrator performs task 202 before or concurrently with task 201, but in any case, the prior art is disadvantageous in that if there is a problem provisioning either path, often the other successfully provisioned path must be de-provisioned as part of the task of finding an alternative solution for the path that was not successfully provisioned. This is inefficient, and, therefore, the need exists for a technique for efficiently provisioning multiple traffic paths in a transport network.

SUMMARY OF THE INVENTION

The present invention enables the provisioning of one or more paths through one or more transport networks without some of the costs and disadvantages for doing so in the prior art. In particular, the illustrative embodiment enables a plurality of traffic paths to be provisioned through one or more transport networks coherently. For the purposes of this specification, a plurality of traffic paths are provisioned through one or more transport networks "coherently" when none of the traffic paths are provisioned unless all of the traffic paths can be provisioned. The illustrative embodiment also enables the traffic paths to be coherently provisioned to be a part of two or more separate transports networks. And still furthermore, the illustrative embodiment enables one or more of the traffic paths to be multicast traffic paths.

In accordance with the illustrative embodiment, all of the nodes in one or more transport networks are listed that must be configured to provision all of the proposed traffic paths, and all of the nodes are checked, one after another, to ensure that each node can, in fact, provide all of the resources needed to establish all of the proposed traffic paths before any of the traffic paths are actually provisioned. In accordance with the illustrative embodiment, all of the nodes identified are first visited, one after another, by a set-up message that checks to ensure that each of them can, in fact, provide all of the resources needed to establish all of the proposed traffic paths. As each node is visited, the set-up message directs each node to reserve, but not actually provision, the resources to be provided by that node for all of the proposed traffic paths. In contrast, when any node is not able to provide all of the resources needed to establish all of the proposed traffic paths, then the set-up message stops its forward progress, re-visits each of the nodes it has already visited, de-reserves the previously reserved resources at those nodes, and reports an error message to the network administrator that indicates why the proposed traffic paths could not be provisioned.

When all of the nodes have been visited and the resources reserved for all of the proposed traffic paths, then the set-up message re-visits each node, one after another. As the set-up message re-visits each node, the set-up message directs each node to actually provision the resources that had been previously reserved. When all of the reserved resources have been actually provisioned, all of the proposed traffic paths have been successfully provisioned. In this way, multiple traffic paths can be provisioned through one or more transport networks coherently.

The illustrative embodiment comprises: routing a set-up message to a plurality of nodes in a transport network, wherein the set-up message reserves network resources for a plurality of traffic paths through the transport network as the set-up message visits each of the plurality of nodes; and routing the set-up message to the plurality of nodes in the transport network, wherein the set-up message provisions network resources for the plurality of traffic paths through the transport network as the set-up message revisits each of the plurality of nodes.

DETAILED DESCRIPTION

Figure 1:
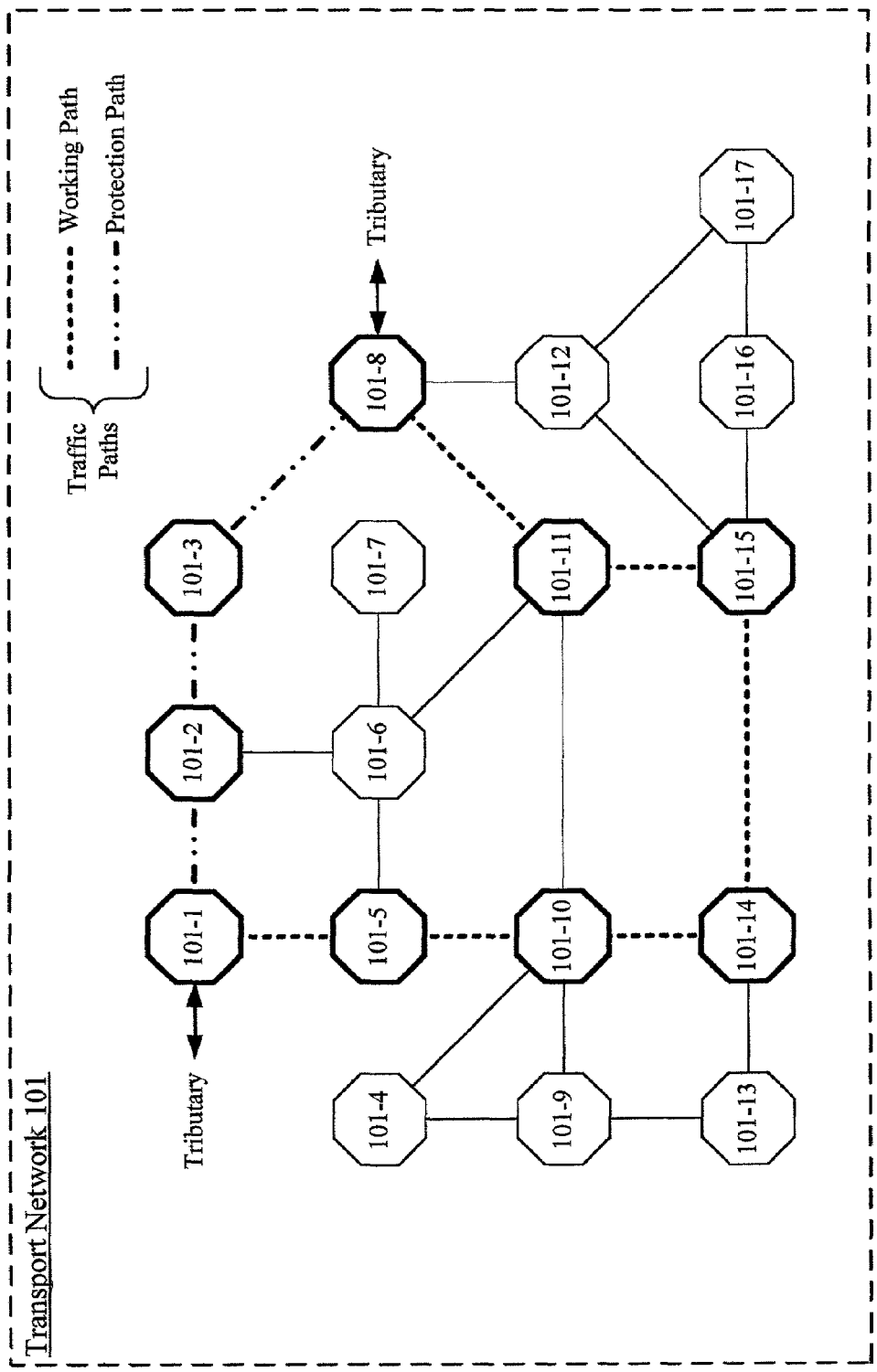
FIG. 1 depicts a schematic diagram of a transport network in the prior art.
Figure 2:
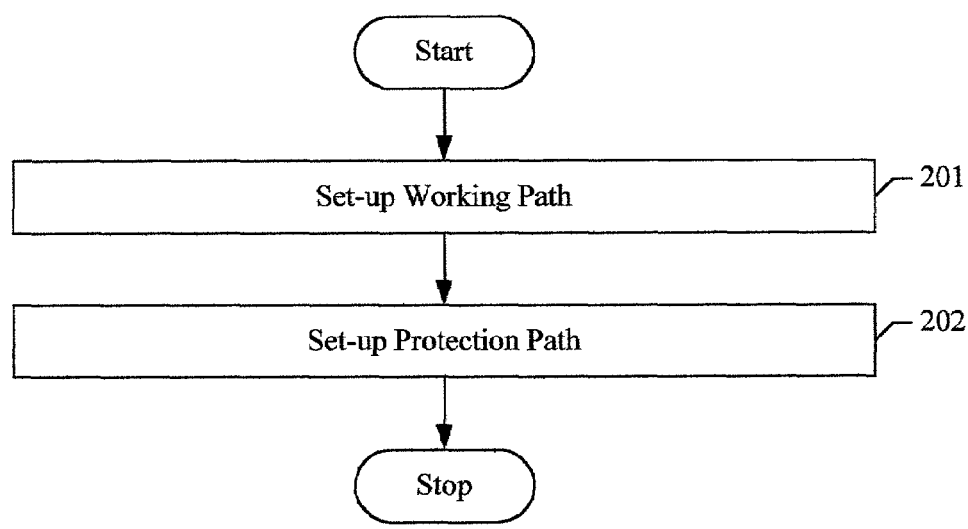
FIG. 2 depicts a flowchart of the tasks involved in provisioning two traffic paths through a transport network in the prior art.
Figure 3:
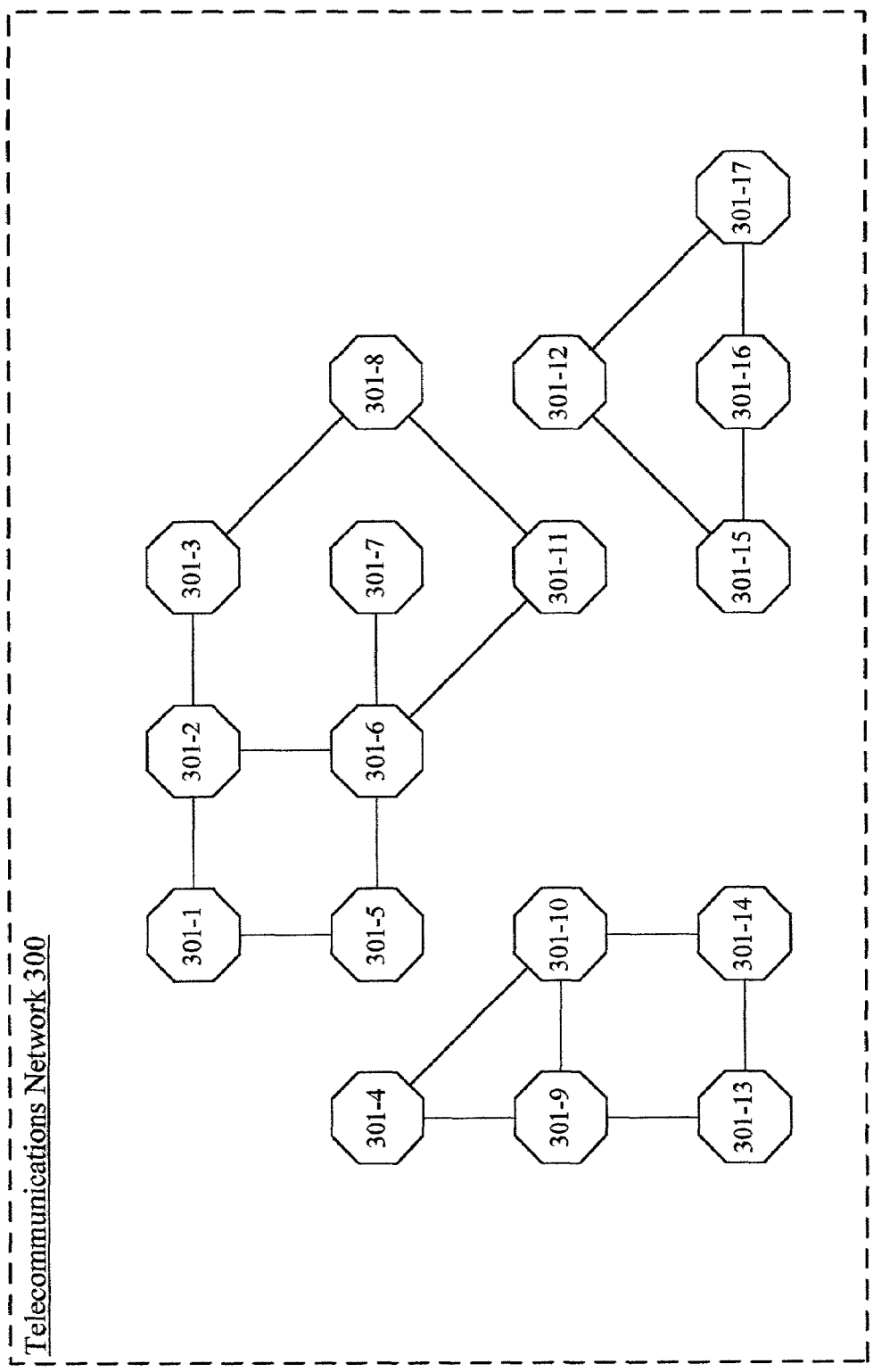
FIG. 3 depicts a schematic diagram of three transport networks in accordance with the illustrative embodiment of the present invention.

FIG. 3 depicts a schematic diagram of telecommunications network 300 in accordance with the illustrative embodiment of the present invention.

Telecommunications network 300 comprises seventeen (17) nodes, nodes 301-1 through 301-17, in three transport networks, transport networks 311 through 313, that are interconnected by logical and physical communications links for carrying traffic as shown. In other words, there is a logical and physical communications link for carrying traffic between node 301-1 and node 301-2, but there is no direct logical or physical communications link for carrying traffic between node 301-1 and node 301-3 or node 301-4 and 301-5.

For the purposes of this specification, a "node" is defined as:

i. a switch, or
  ii. a time-slot interchanger, or
  iii. a router, or iv. a cross-connect, or v. a multiplexor, or vi. a demultiplexor, or vii. any combination of i, ii, iii, iv, v, vi, and vii.

Although the illustrative embodiment is depicted as comprising seventeen (17) nodes, after reading this specification it will be clear to those skilled in the art how to make and use embodiments of the present invention that comprise four or more nodes.

Telecommunications network 300 comprises three transport networks, transport network 311, transport network 312, and transport network 313. In accordance with the illustrative embodiment, transport networks 311 through 313 conform to the SONET protocol standard. After reading this specification, however, it will be clear to those skilled in the art how to make and use embodiments of the present invention in which some or all of the transport networks use other protocol standards (e.g., dense wavelength division multiplexing, etc.). For example, in an alternative embodiment of the present invention, one transport network can use one protocol (e.g., SONET, etc.) while another transport network in the same telecommunications network uses a different protocol (e.g., dense wavelength division multiplexing, etc.).

Transport networks 311 through 313 are distinct, which means that telecommunications network 300 does not comprise the facilities necessary to carry payload traffic from one transport network into another transport network.

Transport network 311 comprises nodes 301-1, 301-2, 301-3, 301-5, 301-6, 301-7, 301-8, and 301-11 and the communications links between them as depicted in FIG. 3. Transport network 312 comprises nodes 301-4, 301-9, 301-10, 301-13, and 301-14 and the communications links between them as depicted in FIG. 3. Transport network 313 comprises nodes 301-12, 301-15, 301-16, and 301-17 and the communications links between them as depicted in FIG. 3.

Transport networks 311 and 312 are mesh networks whereas transport network 313 is a ring network, and the illustrative embodiment is applicable to both ring and mesh networks. For the purposes of this specification, a "mesh network" is defined as an arrangement of interconnected nodes that have anything other than a ring topology.

Figure 4:
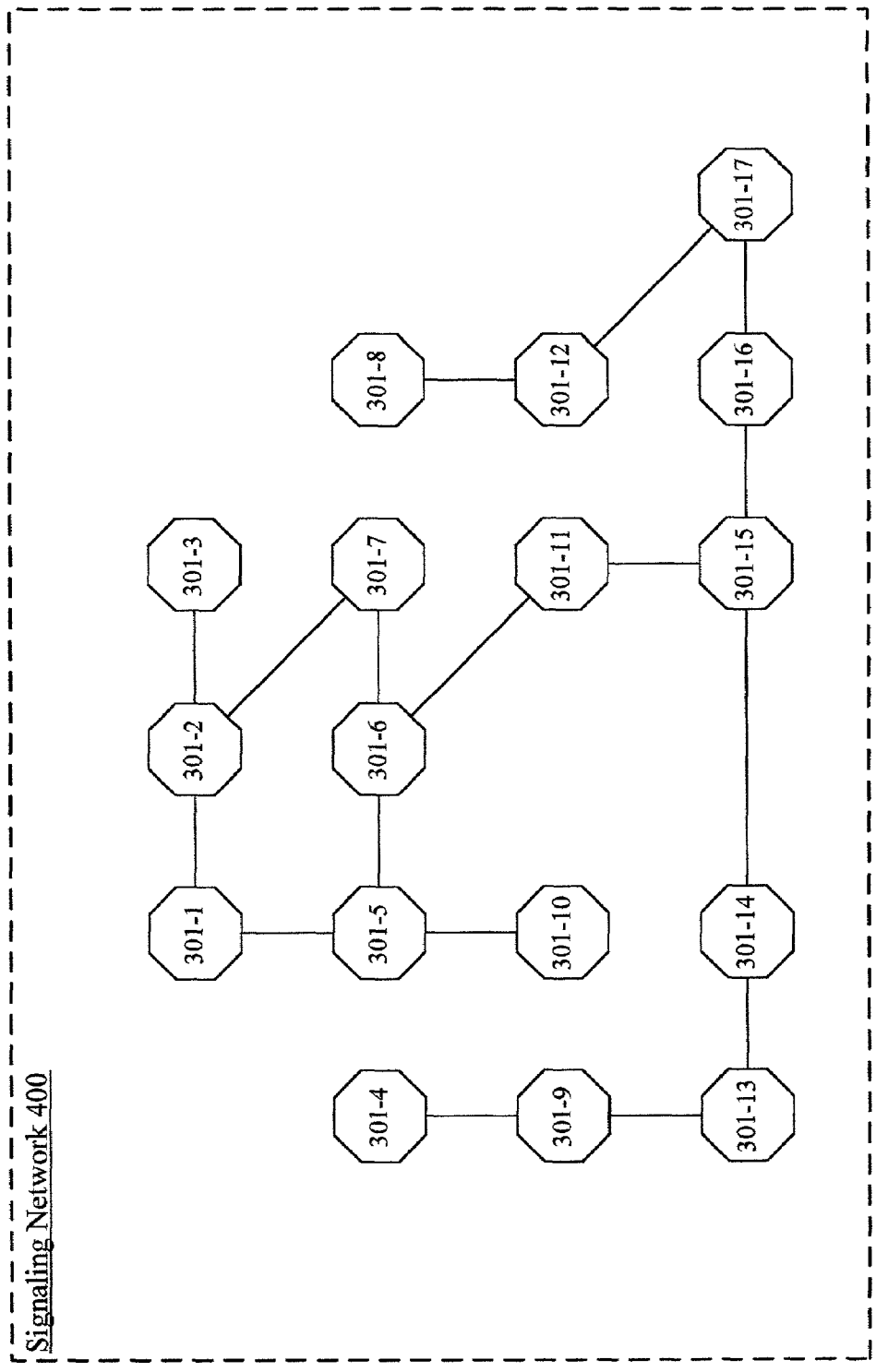
FIG. 4 depicts a schematic diagram of a signaling network that supports the transport networks depicted in FIG. 3.

All of the transport facilities in telecommunications network 300 are administered via a single signaling network, signaling network 400, that is depicted in FIG. 4. In other words, the owner/operator of transport network 300 uses signaling network 400 to administer (e.g., to provision and de-provision, etc.) traffic paths in transport networks 311, 312, and 313. Each node in signaling network 400 is concomitant with one node in one of transport networks 311, 312, or 313.

Signaling network 400 has a mesh topology. After reading this specification, however, it will be clear to those skilled in the art how to make and use signaling networks that have any topology so long as there is at least one logical (and possibly also physical) path for carrying signaling messages (in contrast to traffic) between each pair of nodes in the signaling network. Furthermore, after reading this specification, it will be clear to those skilled in the art that the topology of the signaling network can be, but need not be, related to the topology of one or more of the transport networks.

In accordance with the illustrative embodiment, there are seventeen (17) logical links in signaling network 400. After reading this specification, it will be clear to those skilled in the art how to make and use embodiments of the present invention that comprise a different number of logical links.

In accordance with the illustrative embodiment, signaling network 400 uses the IP and RSVP-TE protocols. After reading this specification, however, it will be clear to those skilled in the art how to make and use embodiments of the present invention in which the signaling network uses another protocols (e.g., CR-CDP, SS-7, etc.).

In accordance with the illustrative embodiment, a "cost value" or "weight" is assigned to each logical link in signaling network 400 for the purpose of minimizing the total "cost" of provisioning one or more paths in transport networks 311, 312, and 313. After reading this specification, it will be clear to those skilled in the art how to assign a cost value to:

i. each logical link in signaling network 400, or ii. each physical link in signaling network 400, or iii. each logical link and each physical link in signaling network 400.

After reading this specification, it will be clear to those skilled in the art how to make and use embodiments of the present invention in which a value of zero (0) is assigned to each logical and each physical link in signaling network 400, and in which the "cost" of provisioning one or more paths in signaling network 400 is ignored.

In accordance with the illustrative embodiment, the seventeen (17) logical links in signaling network 400 are assigned a cost as depicted in Table 1.

TABLE 1

Costs Assigned to Links in Signaling Network 400

| Link | From Node 401-a | To Node 401-b | Cost |
| --- | --- | --- | --- |
| 1. | 301-1 | 301-2 | 4 |
| 2. | 301-1 | 301-2 | 7 |
| 3. | 301-2 | 301-3 | 3 |
| 4. | 301-2 | 301-7 | 1 |
| 5. | 301-4 | 301-9 | 12 |
| 6. | 301-5 | 301-6 | 8 |
| 7. | 301-5 | 301-10 | 3 |
| 8. | 301-6 | 301-7 | 5 |
| 9. | 301-6 | 301-11 | 2 |
| 10. | 301-8 | 301-12 | 9 |
| 11. | 301-9 | 301-13 | 10 |
| 12. | 301-11 | 301-15 | 6 |
| 13. | 301-12 | 301-17 | 2 |
| 14. | 301-13 | 301-14 | 14 |
| 15. | 301-14 | 301-15 | 7 |
| 16. | 301-15 | 301-16 | 2 |
| 17. | 301-16 | 301-117 | 7 |

In accordance with the illustrative embodiment, the costs assigned to each link in signaling network is related to the temporal latency associated with transmitting a set-up message across that link. After reading this specification, it will be clear to those skilled in the art how to base the cost assigned to each link based on alternative or additional factors (e.g., the linear distance of that link, the probability of connection admittance, the bandwidth of the link, the bit error rate of the link, etc.). How the cost values in Table 1 are used is described in detail below.

Figure 5:
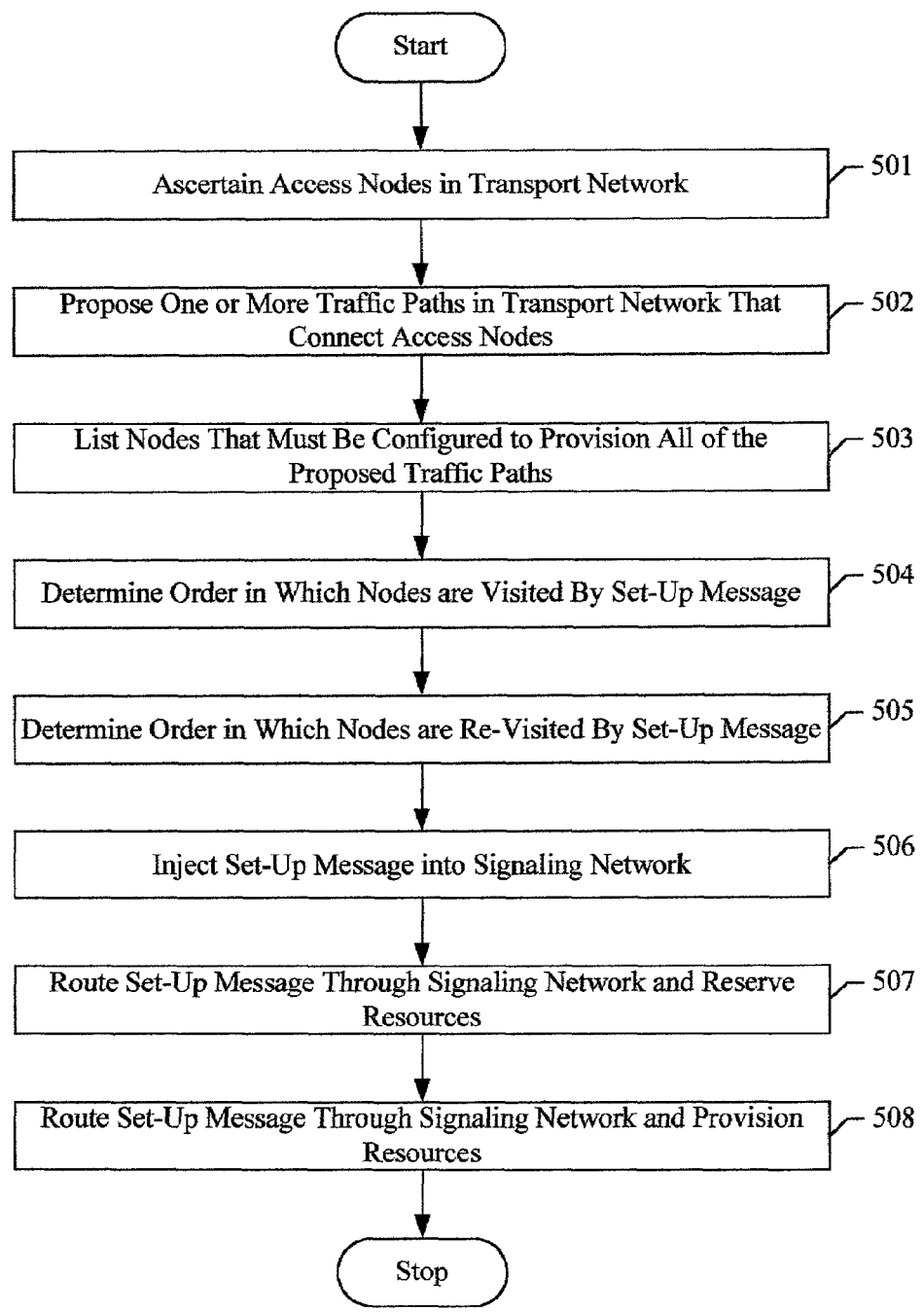
FIG. 5 depicts a flowchart of the tasks associated with coherently provisioning multiple traffic paths through the transport networks depicted in FIG. 3.

FIG. 5 depicts a flowchart of the tasks associated with provisioning one or more traffic paths through transport networks 311, 312, and 313 in accordance with the illustrative embodiment of the present invention.

At task 501, the need to connect tributaries at two or more access nodes with one or more traffic paths through transport networks 311, 312, and 313 is recognized. For the purposes of this specification, an "access node" is defined as a node in a transport network that connects the transport network to a tributary. As part of task 501, the access nodes for the services to be provisioned are ascertained in well-known fashion.

Figure 6:
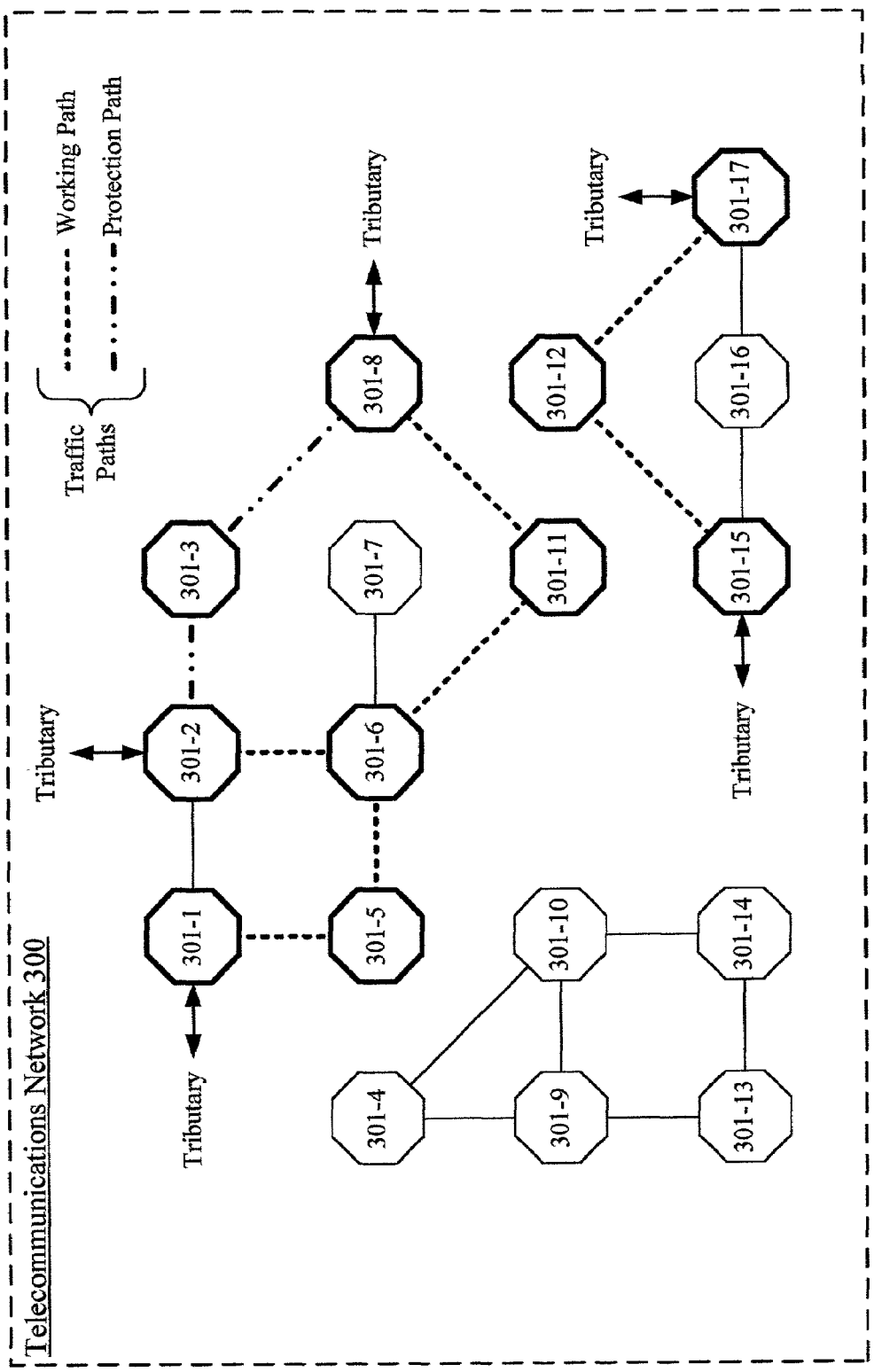
FIG. 6 depicts a schematic diagram of the transport networks depicted in FIG. 3 that highlights the proposed traffic paths.
Figure 7:
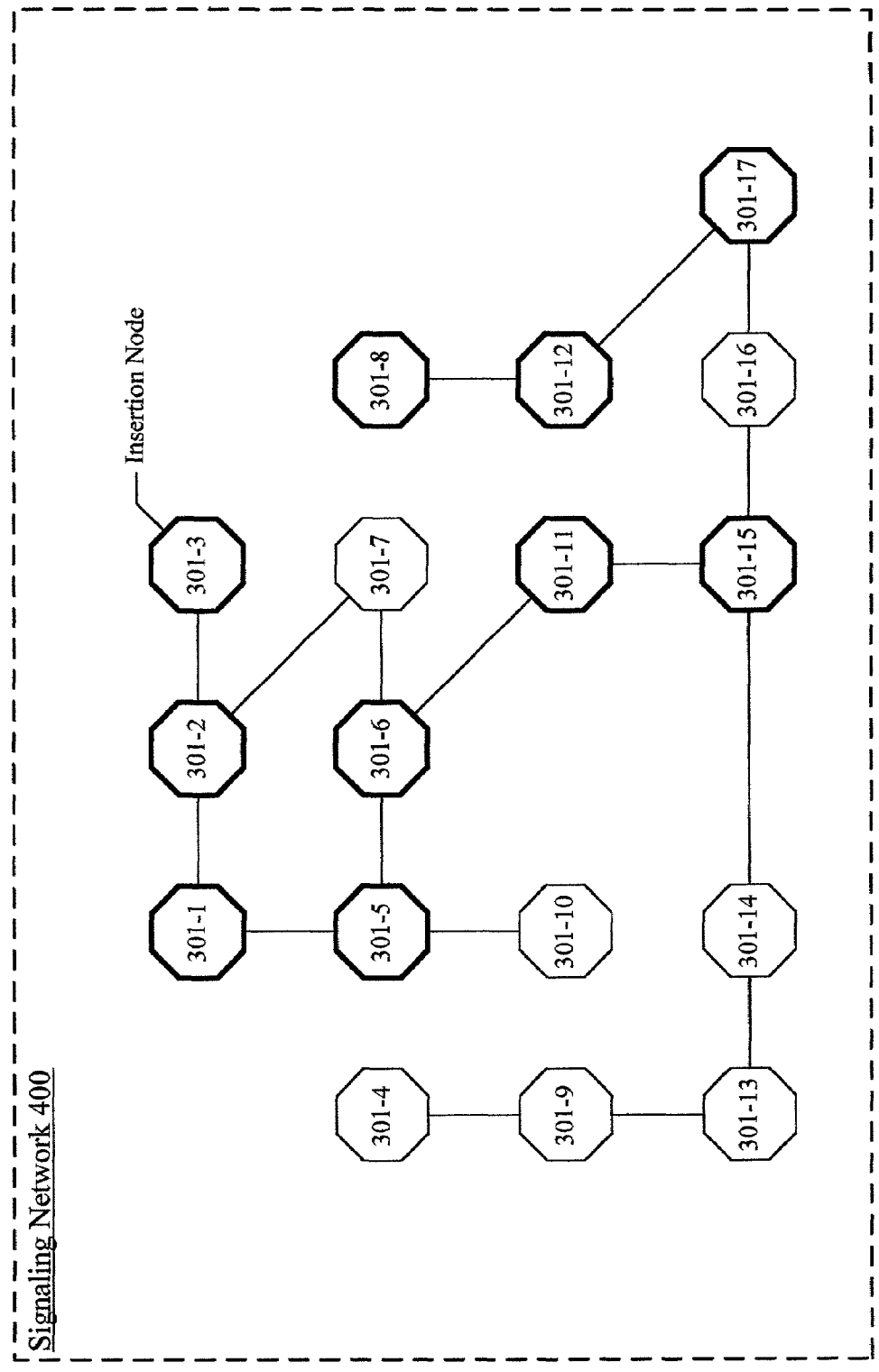
FIG. 7 depicts a schematic diagram of the signaling network depicted in FIG. 4 that highlights the injection node and the nodes that must be visited in order to provision the proposed traffic paths depicted in FIG. 6.

As depicted in FIG. 6, the illustrative embodiment comprises five access nodes: node 301-1, 301-2, 301-8, 301-15, and 301-17. After reading this specification, it will be clear to those skilled in the art how to make and use embodiments of the present invention that have more than two access nodes.

At task 502, one or more traffic paths through transport network 300 are proposed to be provisioned, which traffic paths are characterized by some bandwidth, bit error rate, and latency. In accordance with the illustrative embodiment, three traffic paths are proposed to be provisioned; one unicast traffic path, one multipath traffic path, and one unicast protection path to protect one leg of the multipath traffic path.

As depicted in FIG. 6, the proposed unicast working path extends from node 301-15 to node 301-12 and to node 301-17 in transport network 313. Furthermore, the proposed unicast working path is an OC-768 traffic path.

As also depicted in FIG. 6, one leg of the proposed multipath traffic path extends from node 301-8 to node 301-11 to node 301-6 to node 301-5 and to node 301-1 in transport net second leg of the proposed multipath traffic path extends from node 301-8 to node 301-11 to node 301-6 and to node 301-2, also in transport network 311. The proposed unicast protection path only protects the second leg of the proposed multipath traffic path and extends from node 301-8 to node 301-3 and to node 301-2. Furthermore, both legs of the proposed multicast traffic path and the protection path are OC-192 paths.

In accordance with the illustrative embodiment of the present invention, there are no traffic paths proposed for transport network 312.

After reading this specification, it will be clear to those skilled in the art how to make and use embodiments of the present invention in which any number of unicast paths and multicast traffic paths are proposed and in which any number of working paths and protection paths are proposed. Furthermore, after reading this specification, it will be clear to those skilled in the art how to determine all possible paths that connect two access nodes in a transport network.

In accordance with the illustrative embodiment, the unicast traffic path, the multipath traffic path, and the unicast protection path are to be provisioned coherently. In other words, none of the traffic paths are to be provisioned unless all of them can be provisioned. The illustrative embodiment is particularly useful in that it enables the coherent provisioning of traffic paths in distinct transport networks.

To this end, at task 503, all of the nodes in telecommunications network 300 are listed that must be configured to provision all of the traffic paths determined in task 502. In accordance with the illustrative embodiment as depicted in FIG. 6, there are ten (10) nodes in telecommunications network 300 that must be configured to provision all of the traffic paths proposed in task 502. These eight (8) nodes are listed in Table 2.

TABLE 2

List of All Nodes That Must Be Configured To Provision All of the Traffic Paths Proposed in Task 502.

| Nodes |
|---|
| 301-1 |
| 301-2 |
| 301-3 |
| 301-5 |
| 301-6 |
| 301-8 |
| 301-11 |

TABLE 2-continued

List of All Nodes That Must Be Configured To Provision All of the Traffic Paths Proposed in Task 502.

| Nodes |
|---|
| 301-12 |
| 301-15 |
| 301-17 |

In accordance with the illustrative embodiment, all of the nodes identified in task 503 are checked, one after another, to ensure that each node can, in fact, provide all of the resources needed to establish all of the proposed traffic paths. In accordance with the illustrative embodiment, all of the nodes identified in task 503 are first visited, one after another, by a set-up message that checks to ensure that each of them can, in fact, provide all of the resources needed to establish all of the proposed traffic paths. As each node is visited, the set-up message directs each node to reserve, but not actually provision, the resources to be provided by that node for all of the traffic paths. After all of the nodes identified in task 503 have been visited and the resources reserved for all of the traffic paths, then the set-up message re-visits each node, one after another. As the set-up message re-visits each node, the set-up message directs each node to actually provision the resources that had been previously reserved. When the set-up message re-visits all of the nodes, all of the proposed traffic paths have been successfully provisioned.

In all cases, as the set-up message originally visits each node and the set-up message checks to ensure that each can, in fact, provide the necessary resources, if for any reason any node cannot provide the necessary resources then the set-up message stops reserving resources, re-visits the nodes already visited, un-reserves the previously reserved resources, and reports to the network administrator on the failure to provision the traffic paths.

To this end, the illustrative embodiment determines the order in which the nodes listed in task 503 are visited by the set-up message and the order in which the nodes are re-visited by the set-up message.

At task 504, the order in which the nodes listed in task 503 are visited is determined. First, it should be remembered that the set-up message traverses signaling network 400 to visit the nodes. Second, the set-up message can be injected into signaling network 400 by the network administrator at any node, hereinafter called the "insertion" node, in signaling network 400, regardless of whether the insertion node is one of the nodes listed in task 503 or not. In accordance with the illustrative embodiment, node 301-3 is the insertion node.

In accordance with the illustrative embodiment, the nodes listed in Table 2 are first visited in numerical order as depicted in Table 3 and the cost data in Table 1 are ignored.

TABLE 3

Order in Which Nodes in Table 2 Are Visited.

| Nodes |
|---|
| 301-1 |
| 301-2 |
| 301-3 |
| 301-5 |
| 301-6 |
| 301-8 |
| 301-11 |
| 301-12 |

TABLE 3-continued

Order in Which Nodes in Table 2 Are Visited.

| Nodes |
|---|
| 301-15 |
| 301-17 |

In some alternative embodiments of the present invention, however, the cost values in Table 1 are used to minimize the "cost" (e.g., minimize the delay, maximize the probability of success, etc.) of the set-up message in visiting the nodes in Table 2. In other words, if the cost data in Table 1 is analogized to distances and the nodes in Table 2 as cities, the process for determining the order in which the nodes are visited is analogous to the well-known "Traveling Salesman" problem.

At task 505, the order in which the nodes listed in task 503 are re-visited is determined. In accordance with the illustrative embodiment, the nodes are re-visited in the reverse order in which they are visited in accordance with Table 3 and the cost data in Table 1 are ignored. Table 4 lists the order in which the nodes listed in Table 2 are re-visited.

TABLE 4

Order in Which Nodes in Table 2 Are Re-Visited.

| Nodes |
|---|
| 301-17 |
| 301-15 |
| 301-12 |
| 301-11 |
| 301-8 |
| 301-6 |
| 301-5 |
| 301-3 |
| 301-2 |
| 301-1 |

In some alternative embodiments of the present invention, however, the order in which the nodes are re-visited is unrelated to the order in which the nodes are first visited.

In some alternative embodiments of the present invention, the set-up node does not re-visit each node to trigger the actual provisioning of the resources at that node, but directs each node to actually provision the reserved resources after some time interval (e.g., 2 seconds, 2 minutes, etc.) unless the node is directed otherwise by the set-up message. In these cases, after the set-up message has confirmed that the resources are available at all of the requisite nodes, the set-up message can return to the insertion node to inform the network administrator that the traffic paths have been successfully provisioned.

In some alternative embodiments of the present invention, after the set-up message has confirmed that the resources are available at all of the nodes, the set-up message can send multicast messages to each of the nodes to direct the provisioning of the resources.

At task 506, the set-up message is injected into signaling network 400 at the injection node. The set-up message itself comprises information that either explicitly or implicitly indicates:

i. the nodes it must visit, and
ii. the order in which it must visit those nodes, and
iii. an indicium of the resources to be provided by each of the nodes, and
iv. the order in which it must re-visit the nodes.

For example, the set-up message in accordance with the illustrative embodiment explicitly indicates the information contained in Table 5.

TABLE 5

Information Explicitly Contained in Set-Up Message

| Order In Which Nodes Are Visited | Resources to be Provided by That Node |
|---|---|
| 301-1 | OC-192 Working Path to Node 301-5 |
| 301-2 | OC-192 Working Path to Node 301-6 and OC-192 Protection Path to Node 301-3 |
| 301-3 | OC-192 Protection Path to Nodes 301-2 and 301-8 |
| 301-5 | OC-192 Working Path to Nodes 301-1 and 301-6 |
| 301-6 | OC-192 Working Path to Nodes 301-2, 301-5, and 301-11 |
| 301-8 | OC-192 Protection Path to Node 301-3 and OC-192 Working Path to Node 301-11 |
| 301-11 | OC-192 Working Path to Nodes 301-6 and 301-8 |
| 301-12 | OC-768 Working Path to Nodes 301-15 and 301-17 |
| 301-15 | OC-768 Working Path to Node 301-12 |
| 301-17 | OC-768 Working Path to Node 301-12 |

In accordance with the illustrative embodiment, the order in which the set-up message re-visits each node is implicit in the order in which it first visits the nodes, and, therefore, it need not be explicitly recited in Table 5. In some alternative embodiments of the present invention, the order in which the set-up message re-visits each node is not implicit in the order in which it first visits the nodes, and, therefore, that order must be explicitly recited in Table 5. Furthermore, the list of nodes that the set-up message must visit and re-visit in also implicit in the order in which it first visits the nodes, and, therefore, it need not be explicitly recited in Table 5 either.

At task 507, the set-up message traverses signaling network 301 in the order indicated in Table 5. For example, when the set-up message reaches node 301-1, the set-up message confirms that node 301-1 is capable of providing the resources listed in Table 5. If node 301-1 is capable of providing those resources, then the set-up message directs node 301-1 to reserve, but not actually provision those resources. In such case, the set-up message proceeds to node 301-2.

In contrast, if node 301-1 is not capable of providing those resources, then no resources are reserved and the set-up message returns to the injection node with an indication for the network administrator that node 301-1 is incapable of providing the sought after resources.

When node 301-1 is capable of providing the sought after resources and the resources have been reserves, the set-up message proceeds to node 301-2. If node 301-2 is capable of providing the resources listed in Table 5, then the set-up message directs node 301-2 to reserve, but not actually provision those resources. In such case, the set-up message proceeds to node 301-3.

In contrast, if node 301-2 is not capable of providing the sought after resources, then no resources at node 301-2 are reserved and the set-up message returns to node 301-1 and unreserves the resources previously reserved there and returns to the injection node with an indication for the network administrator that node 301-2 is incapable of providing the sought after resources.

Subsequently, the set-up message traverses the all of the nodes in Table 2 in the order indicated in Table 5 and reserves, if possible, the sought after resources. If any of the nodes is incapable of providing the sought after resources, then the set-up message re-visits the nodes it has already has visited and unreserves the resources at those nodes and returns to the injection node with an indication for the network administrator on which node is incapable of providing the sought after resources.

When the set-up message finally reaches the last node in Table 5 and has determined that all of the nodes are capable of providing the sought after resources and all of the sought after resources have be reserved, control passes to task 508.

At task 508, the set-up message re-visits all of the nodes in Table 5, one after another, and directs each node to actually provision the previously reserved resources. Thereafter, the set-up message returns to the injection node with a message for the network administrator that indicates that the provisioning of the proposed traffic paths has been accomplished.

In some alternative embodiments of the present invention, the set-up message does not re-visit all of the nodes in Table 5 one after another, but spawns one or more subordinate set-up messages that are sent as proxies to re-visit some or all of the nodes. In this case, the resources at some or all of the nodes can be provisioned in parallel, rather than serially as in the illustrative embodiment.

By following the procedure outlined in FIG. 5 and described in detail above, the illustrative embodiment enables multiple traffic paths to be coherently provisioned through a transport network.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   routing a set-up message to a plurality of nodes in at least one transport network, wherein said set-up message reserves network resources for multiple different traffic paths through said at least one transport network as said set-up message visits each of said plurality of nodes, wherein each different traffic path comprises a unique subset of nodes leading to the a destination node; and
   routing said set-up message to said plurality of nodes in said at least one transport network, wherein said set-up message provisions said reserved network resources for the multiple different traffic paths through said at least one transport network as said set-up message revisits each of said plurality of nodes of each traffic path;
   wherein the reserved network resources for the multiple different traffic paths through said at least one transport network are provisioned only if all of the resources needed for each of the multiple different traffic paths through said at least one transport network have been successfully reserved.

2. The method of claim 1 wherein at least one of the multiple different traffic paths through said at least one transport network is a working path and wherein at least one of the multiple different traffic paths through said at least one transport network is a protection path for said working path.

3. The method of claim 1 wherein said set-up message revisits each of said plurality of nodes in the reverse order in which said set-up message visits each of said plurality of nodes.

4. The method of claim 1 wherein said transport network is a mesh network.

5. The method of claim 1 wherein said transport network is a ring network.

6. The method of claim 1 wherein at least one of the multiple different traffic paths through said at least one transport network is a multicast traffic path.

7. The method of claim 1 wherein some of said plurality of nodes are in a first transport network and some of said nodes are in a second transport network.

8. The method of claim 1 wherein each of the multiple different traffic paths through said at least one transport network is a multi-hop path that comprises a different set of nodes.

9. The method of claim 1 wherein at least two of the different traffic paths through said at least one transport network connect the destination node via different sets of intermediate nodes.

10. A method comprising:
    routing a set-up message to a plurality of nodes in at least one transport network, wherein said set-up message reserves network resources for multiple different traffic paths through said at least one transport network as said set-up message visits each of said plurality of nodes, wherein each different traffic path comprises a unique subset of nodes leading to a same destination node; and
    revisiting said plurality of nodes with one or more set-up messages, wherein said one or more set-up messages provision said reserved network resources for the multiple different traffic paths through said at least one transport network as said one or more set-up messages revisit each of said plurality of nodes of each traffic path;
    wherein the reserved network resources for the multiple different traffic paths through said at least one transport network are provisioned only if all of the resources needed for each of the multiple different traffic paths through said at least one transport network have been successfully reserved.

11. The method of claim 10 wherein at least one of the multiple different traffic paths through said at least one transport network is a working path and wherein at least one of the multiple different traffic paths through said at least one transport network is a protection path for said working path.

12. The method of claim 10 wherein at least one of the multiple different traffic paths through said at least one transport network is a multicast traffic path.

13. The method of claim 10 wherein some of said plurality of nodes are in a first transport network and some of said nodes are in a second transport network.

14. The method of claim 10 wherein each of the multiple different traffic paths through said at least one transport network is a multi-hop path that comprises a different set of nodes.

15. The method of claim 10 wherein at least two of the different traffic paths through said at least one transport network connect the destination node via different sets of intermediate nodes.

16. A method comprising:
    checking the nodes of multiple proposed different traffic paths through at least one transport network to ensure that each node can provide the resources needed to establish the multiple proposed different traffic paths through said at least one transport network, wherein the nodes are checked by sending a set-up message to the nodes and wherein each of the proposed different traffic paths comprises a unique subset of nodes leading to a same destination node;

reserving, at each node, the resources needed to establish the multiple proposed different traffic paths through said at least one transport network if the resources are available; and provisioning, at each node, the resources needed to establish each one of the multiple proposed different traffic paths through said at least one transport network only if all of the resources needed to establish each one of the multiple proposed different traffic paths through said at least one transport network have been successfully reserved.

17. The method of claim 16 wherein the nodes are checked one node after another.

18. The method of claim 16 wherein the set-up message includes an indication of the order in which to check the nodes.

19. The method of claim 18 wherein provisioning the resources comprises routing the set-up message to the nodes in the reverse order in which the nodes were checked.

20. The method of claim 16 wherein each of the multiple different traffic paths through said at least one transport network is a multi-hop path that comprises a different set of nodes.

21. The method of claim 16 wherein at least two of the different traffic paths through said at least one transport network connect the destination node via different sets of intermediate nodes.

* * * * *